P. WERNICKE.
MOLDING APPARATUS.
APPLICATION FILED JULY 17, 1912.

1,140,552.

Patented May 25, 1915.

Witnesses
C. N. Walter
L. G. Anger

Inventor
Paul Wernicke
by R. Hadda
Attorney

UNITED STATES PATENT OFFICE.

PAUL WERNICKE, OF EILENBURG, GERMANY.

MOLDING APPARATUS.

1,140,552.   Specification of Letters Patent.   Patented May 25, 1915.

Application filed July 17, 1912. Serial No. 709,853.

*To all whom it may concern:*

Be it known that I, PAUL WERNICKE, a subject of the German Emperor, residing at Eilenburg, in Germany, have invented certain new and useful Improvements in Molding Apparatus, of which the following is a specification.

This invention relates to apparatus for molding substances such as cement, mixtures of cement and sand, lime and sand, and the like, and its object is to provide means whereby the material to be molded (which will hereinafter be generally referred to as cement) can be introduced into the mold, and leveled in the same without the use of a separate strickling appliance or the like.

The invention is illustrated in the accompanying drawing, in which—

Figure 1:
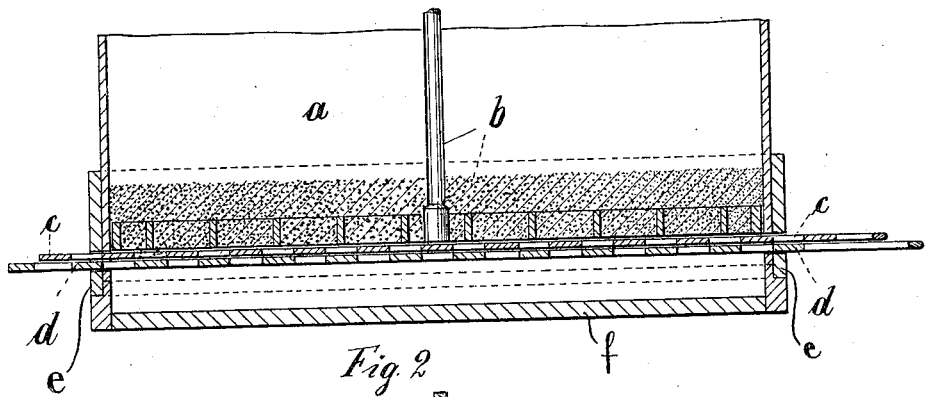
Figure 2:
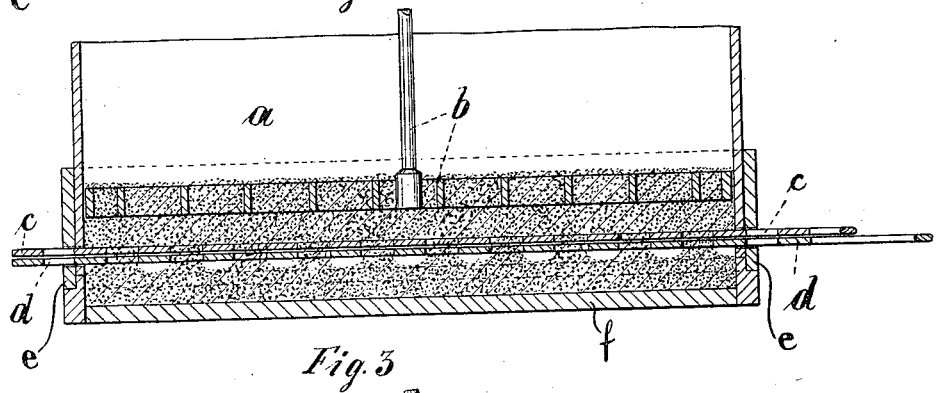

Figure 1 is a vertical section, showing the apparatus at rest; Fig. 2 is a similar section, showing the apparatus at one stage of its operation, and Fig. 3 a section, showing another stage of the operation.

The apparatus comprises a container $a$, in which there is a vertically movable agitating device $b$ consisting of a kind of grating or grid fixed to a shank by means of which it can be raised and lowered in the container for the purpose of loosening cement or the like placed in the container. The floor of the container consists of two perforated plates or grids $c$ and $d$, which project from the sides of the container and are slidable in slots in the container walls. The apertures in these floor plates are so arranged that the holes in the two plates can be made to register, so as to form openings in the floor, and that alternatively the holes in each plate can be covered by imperforate portions of the other plate, these adjustments being made by sliding one plate upon the other. Below the floor $c$, $d$ the wall of the container $a$ has a projection forming a flange $e$, by means of which the container can be slidably engaged with the rim of the molding box $f$.

Figure 3:
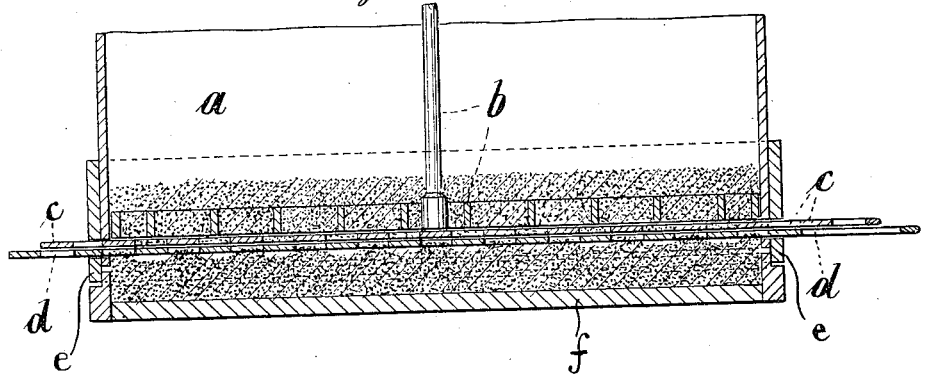

The manner of using the apparatus is as follows: The plates $c$ and $d$ are first adjusted so that the holes are covered, and a suitable quantity of cement is placed in the container, the latter being engaged with the mold $f$, as shown in Fig. 1. The plates $c$ and $d$ are then adjusted so that the holes therein register and form openings in the floor, and the agitator $b$ is raised and lowered, to loosen the cement, which pours through the openings into the mold, as shown in Fig. 2. Owing to cohesion between the particles of cement, the mold cannot by this means be filled up flush with the under-surface of the plate $d$, and cavities are formed in the mold, under the imperforate portions of the plate, as shown in Fig. 1, between ridges or mounds of cement projecting into the floor openings. At this stage the movement of the agitator $b$ is stopped, and the plate $d$ is pushed under the plate $c$, so that the holes are covered. By this means the tops of the mounds are sheared off, and the floor is closed, so that no further material can enter the mold from the container. Then the mold and the container $a$ are moved slightly apart, by lowering the former or raising the latter, to an extent equal to half the thickness of the plate $d$, as shown in Fig. 3. A small amount of clearance is thus produced between the imperforate portions of the plate $d$ and the cement below the same, whereas ridges or mounds of cement still project somewhat into the holes in the plate $d$. The plates are then collectively slid over the top of the mold, so as to smooth the surface of the cement therein.

What I claim as my invention and desire to secure by Letters Patent of the United States is:—

1. In mold filling apparatus the combination of a container consisting of a wall and a horizontally slidable perforated floor, and a vertically movable agitating appliance in said container adapted to rest on said floor, the wall of said container having means below said floor for engagement with the rim of a mold box.

2. In mold filling apparatus the combination of a container consisting of a wall and a horizontally slidable perforated floor, and a vertically movable grid in said container adapted to be lowered on to said floor, the wall of said container having means below said floor for engagement with the rim of a mold box.

In witness whereof I have signed this specification in the presence of two witnesses.

PAUL WERNICKE.

Witnesses:
 MORITZ SPREER,
 RUDOLPH FRICKE.

Copies of this patent may be obtained for five cents each, by addressing the "Commissioner of Patents. Washington, D. C."